(12) United States Patent
Line et al.

(10) Patent No.: US 8,474,917 B2
(45) Date of Patent: Jul. 2, 2013

(54) MODULAR FRONT SEAT BACK PANEL

(75) Inventors: Johnathan Andrew Line, Northville, MI (US); John W. Jaranson, Dearborn, MI (US); Christopher J. Kiehler, South Lyon, MI (US); David Marshman, Canton, MI (US); Kendrick Alden Harper, Temperance, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 389 days.

(21) Appl. No.: 12/793,758

(22) Filed: Jun. 4, 2010

(65) Prior Publication Data

US 2011/0298250 A1    Dec. 8, 2011

(51) Int. Cl.
*A47C 7/02*    (2006.01)

(52) U.S. Cl.
USPC ............ 297/452.38; 297/188.04; 297/188.05; 297/217.3

(58) Field of Classification Search
USPC .................. 297/163, 188.04, 188.05, 452.18, 297/452.38, 217.3
See application file for complete search history.

(56) References Cited

U.S. PATENT DOCUMENTS

| | | | | |
|---|---|---|---|---|
| 4,668,010 A | * | 5/1987 | Fujiwara ...................... | 297/150 |
| 5,992,936 A | * | 11/1999 | Greaves ................... | 297/378.14 |
| 7,677,596 B2 | | 3/2010 | Castro et al. | |
| 2005/0248189 A1 | * | 11/2005 | Prasatek et al. .......... | 297/188.04 |
| 2006/0214479 A1 | | 9/2006 | Dwire et al. | |
| 2008/0111355 A1 | | 5/2008 | Zink | |
| 2008/0238169 A1 | | 10/2008 | Hicks et al. | |
| 2008/0252111 A1 | * | 10/2008 | Rothkop et al. ......... | 297/188.04 |
| 2008/0296945 A1 | * | 12/2008 | Bedford et al. ............ | 297/284.4 |
| 2009/0085383 A1 | * | 4/2009 | Hicks et al. ................ | 297/217.3 |
| 2009/0174235 A1 | * | 7/2009 | Olsen et al. ................ | 297/183.5 |
| 2010/0244505 A1 | * | 9/2010 | Demick et al. .......... | 297/188.04 |

FOREIGN PATENT DOCUMENTS

WO            9719727 A1    6/1997

OTHER PUBLICATIONS

Hallman, Jason J., et al., "Characterization of Torso Side Airbag Aggressivity," National Institute of Health, Biomed Sci Instrum, Nov. 5, 2009, 45:101-106 (12 pages).
Viano, David C., "Energy Transfer to an Occupant in Rear Crashes: Effect of Stiff and Yielding Seats," SAE International, 2003 SAE World Congress, Mar. 3, 2003, Detroit, Michigan (12 pages).

* cited by examiner

*Primary Examiner* — David Dunn
*Assistant Examiner* — Timothy J Brindley
(74) *Attorney, Agent, or Firm* — Vichit Chea; Price Heneveld LLP

(57) ABSTRACT

A seat assembly having a seat and a seat back that is pivotally connected to the seat. A back cover is disposed on a rear portion of the seat back. The back cover includes an interior side and an exterior side. The interior side includes a plurality of laterally-extending ribs aligned with a plurality of engagement members. At least one vertically-extending channel is disposed on the exterior side of the back cover.

17 Claims, 9 Drawing Sheets

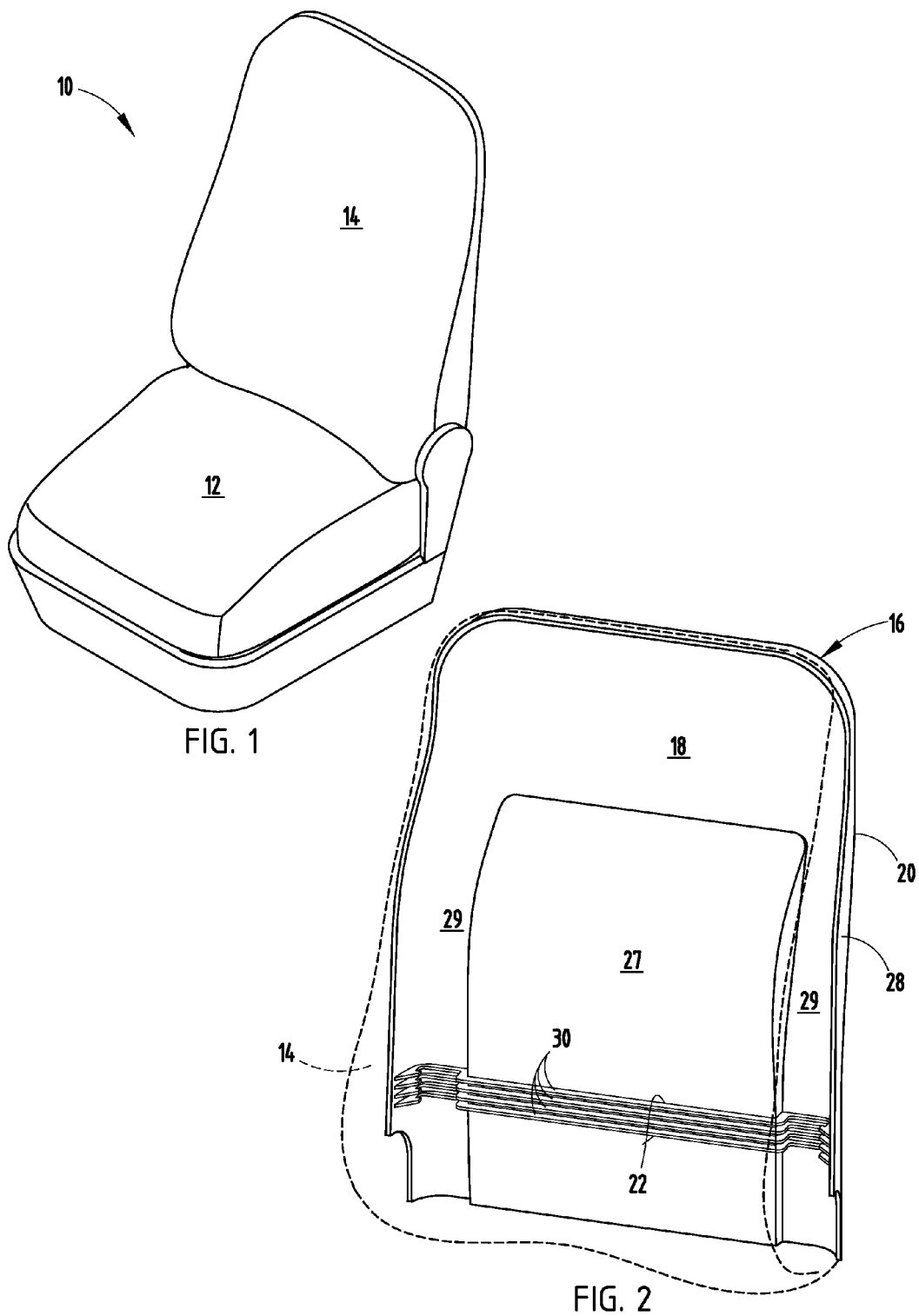

MODULAR FRONT SEAT BACK PANEL

FIELD OF THE INVENTION

The present invention generally relates to a front seat back, and more specifically relates to a modular front seat back panel designed to accommodate a variety of accessories.

BACKGROUND OF THE PRESENT INVENTION

Accessories are sometimes found on front seat backs, but are usually fixed in place on the seat back, or otherwise require a manufacturer to install a different component on the seat back.

SUMMARY OF THE PRESENT INVENTION

One aspect of the present invention includes a seat assembly having a seat. A seat back is pivotally connected to the seat. A back cover is disposed on a rear portion of the seat back. The back cover includes an interior side and an exterior side. The interior side includes a plurality of laterally-extending ribs aligned with a plurality of engagement members. At least one vertically-extending channel is disposed on the exterior side of the back cover.

Another aspect of the present invention includes a vehicle seat assembly having a seat back. A back cover is disposed on the seat back. The back cover includes an interior side and an exterior side. The interior side includes a plurality of laterally extending reinforcing ribs that include a plurality of engagement members. A recess is disposed on the exterior side. The recess includes first and second side edges that have a vertically-extending channel.

Yet another aspect of the present invention includes a method for making a vehicle seat. A seat back is provided. A back cover is attached to the seat back. The back cover includes an interior side and an exterior side. A plurality of laterally-extending reinforcing ribs are formed on the interior side. A plurality of engagement members are formed on the interior side. A recess is formed on the exterior side. Side edges are formed in the recess that have a vertically-extending channel.

These and other aspects, objects, and features of the present invention will be understood and appreciated by those skilled in the art upon studying the following specification, claims, and appended drawings.

BRIEF DESCRIPTION OF THE DRAWINGS

FIG. 1 is a top perspective view of one embodiment of a vehicle seat incorporating one embodiment of a modular front seat back panel of the present invention;

FIG. 2 is a front perspective view of the seat back, including one embodiment of a modular front seat back panel;

DETAILED DESCRIPTION OF EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
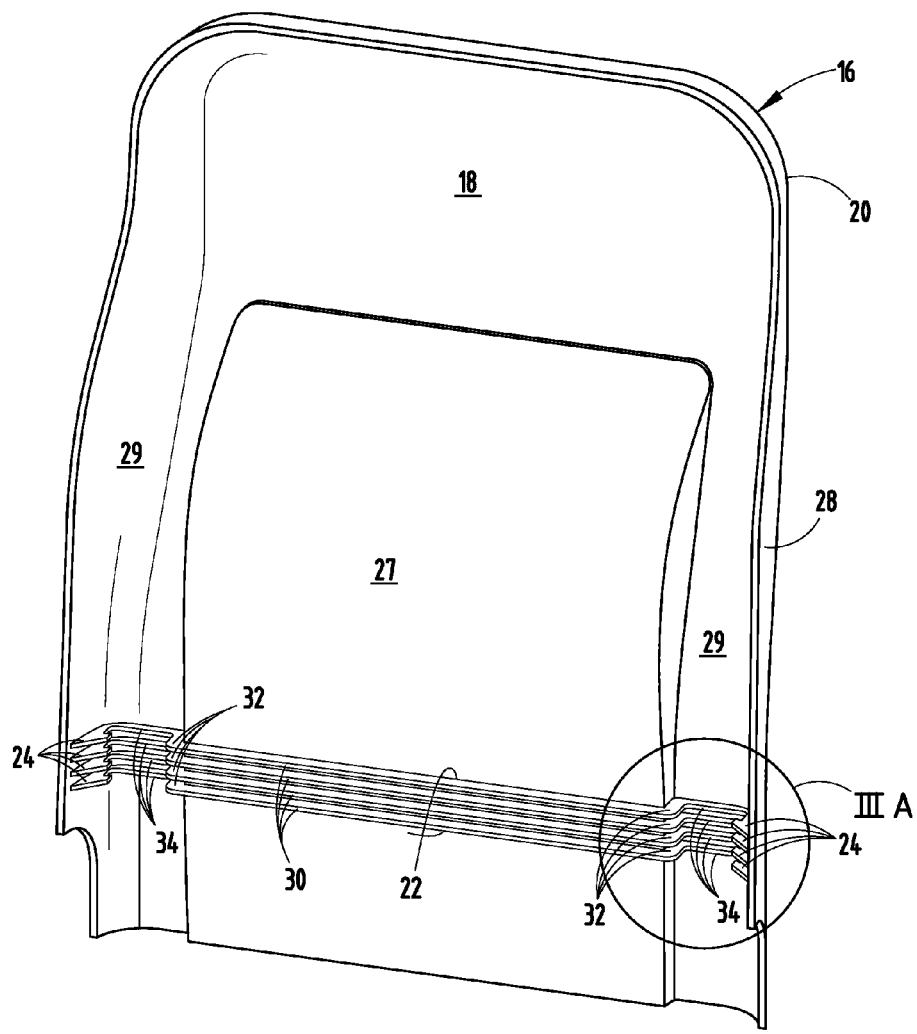
FIG. 3 is a front perspective view of one embodiment of a modular front seat back panel detached from the frame structure of the seat.

Referring to FIGS. 1-3, the reference numeral 10 generally designates a seat assembly having a seat 12. A seat back 14 is pivotally connected to the seat 12. A modular back cover 16 is disposed on a rear portion of the seat back 14. The back cover 16 includes an interior side 18 and an exterior side 20. The interior side 18 includes a plurality of laterally-extending ribs 22 aligned with a plurality of engagement members 24. At least one vertically-extending channel 26 (FIG. 6A) is disposed on the exterior side of the back cover 16.

Referring now to FIGS. 1-3, the seat assembly 10 is designed for use in any of a variety of vehicles. The back cover 16 is formed from a hardened material, such as moldable plastic, that has relatively high strength and rigidity. The interior side 18 includes a main body portion 27 and a sidewall 28 that extends about the periphery of the seat back 14. The main body portion 27 and sidewalls 28 define a channel 29 on either side of the body portion 27. The ribs 22 extend laterally across the main body portion 27 and into the channel 29. The laterally-extending ribs 22 provide lateral strength to the back cover 16. The laterally-extending ribs 22 help prevent objects in the rear of the vehicle from impacting the back cover 16 and smashing through the seat back 14.

In the illustrated embodiment of FIG. 2, four ribs 22 are shown and are generally positioned in a lumbar region of the seat back 14. However, it will be understood by one having ordinary skill in the art that more or less ribs 22 may be applied to the back cover 16. Each of the ribs 22 follows the lateral contour of the interior side 18 of the back cover 16. Each of the ribs 22 includes a main body portion 30 that is integral with a first channel portion 32 (FIG. 3) and a second channel portion 34. The second channel portion 34 terminates at the engagement member 24 disposed on an inside portion of the sidewall 28 of the back cover 16. In the illustrated embodiment, the engagement members 24 include distal hooks 38 (FIG. 4A) that are laterally oriented and which turn inward toward the main body portion 30 of each rib 22.

Figure 3A:
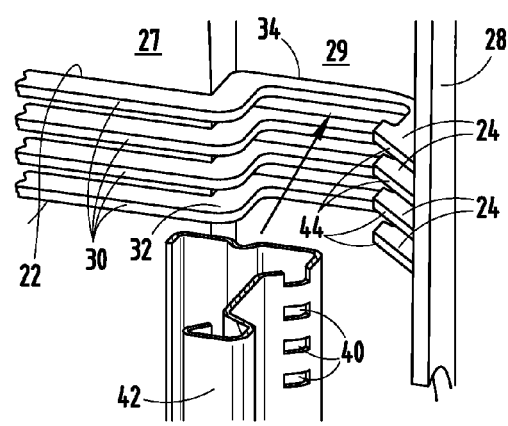
FIG. 3A is an enlarged front perspective view of area IIIA of FIG. 3.

Referring to FIGS. 3 and 3A, each of the distal hooks 38 (FIG. 4A) of the engagement members 24 are designed for engagement with an aperture 40 disposed in a seat frame 42 of the seat assembly 10. In an alternative embodiment, it is contemplated that hooks 38 could project from the seat frame 42 and be received in apertures in the back cover 16. A forward slanted portion 44 of the distal hooks 38 tapers toward the sidewalls 28 of the back cover 16. As discussed above, during a collision event, an item that strikes the exterior side 20 of the back cover 16 and pushes the back cover 16 into the seat back 14 and against the seat frame 42 may be stopped completely, or at least lessen the force felt by a passenger sitting in the vehicle seat 12. Much of the lateral strength of the back cover 16 comes from the laterally-extending ribs 22, which are operably coupled with the seat frame 42 of the vehicle seat 12. The construction of the back cover 16 and the interface of the back cover 16 with the seat frame 42 provides an exceptionally strong and durable seat assembly 10, and as outlined in further detail below, provides a versatile utility feature on the exterior side 20.

Figures 4, 4A:
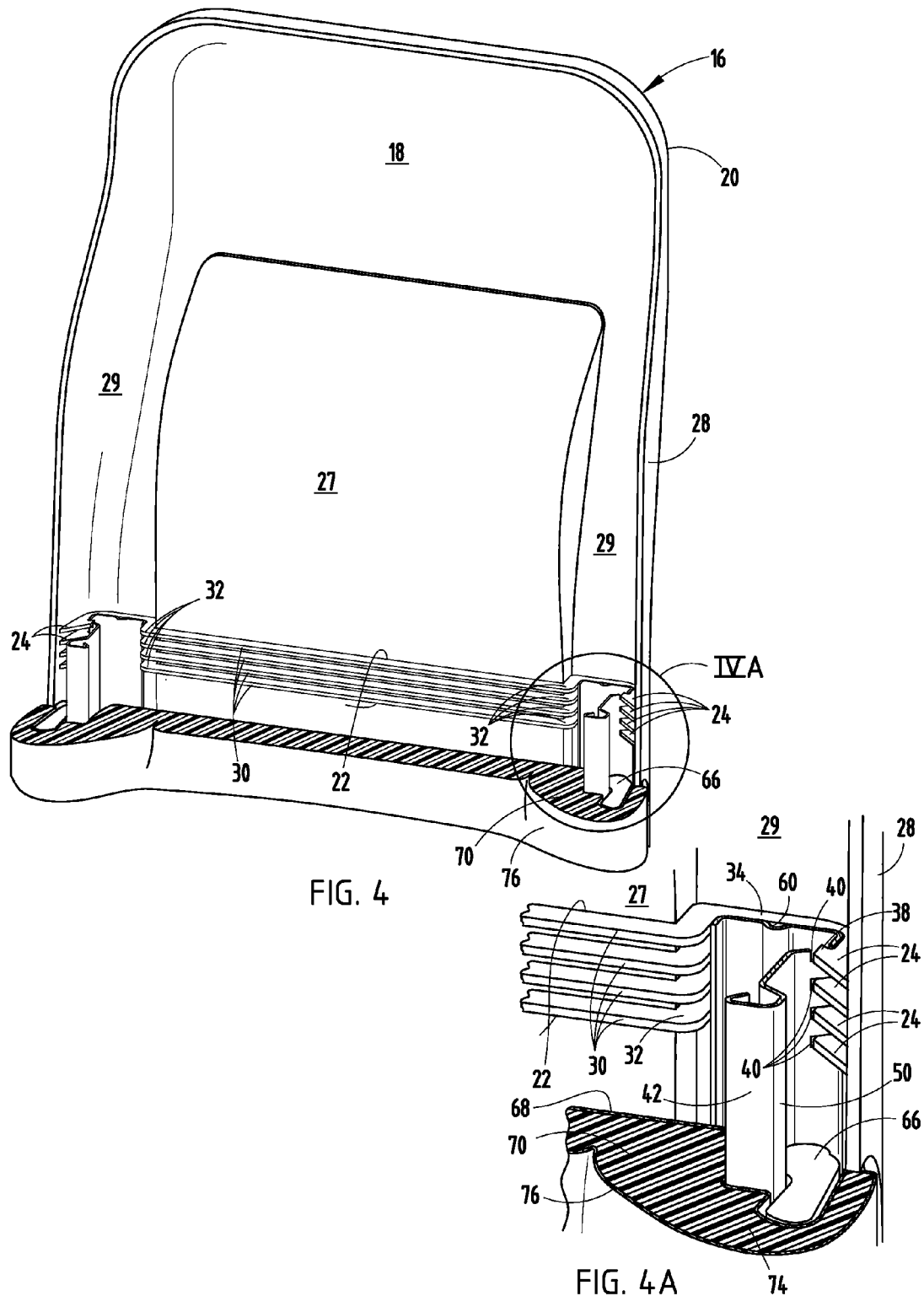
FIG. 4 is a front perspective partial view of the modular front seat back panel of FIG. 3 connected to a seat frame structure and cushion.
FIG. 4A is a top perspective view of area IVA of FIG. 4.
Figure 5:
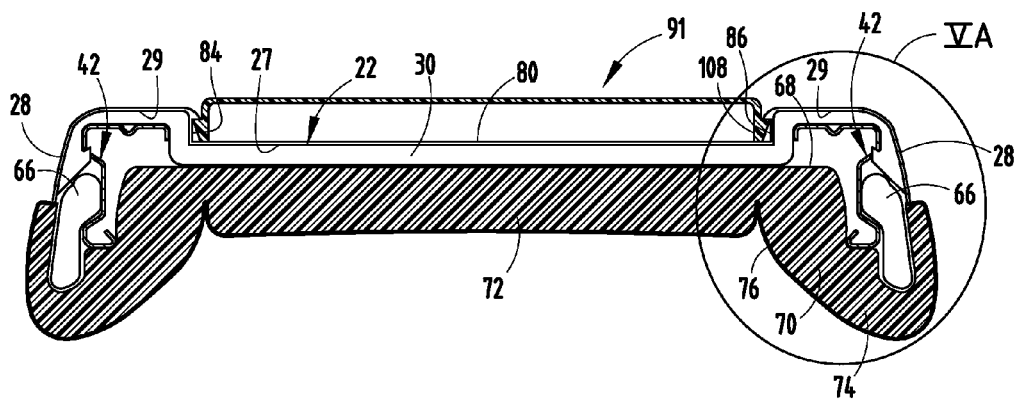
FIG. 5 is a top plan cross-sectional view of the vehicle seat incorporating the modular front seat back of FIG. 3.
Figure 5A:
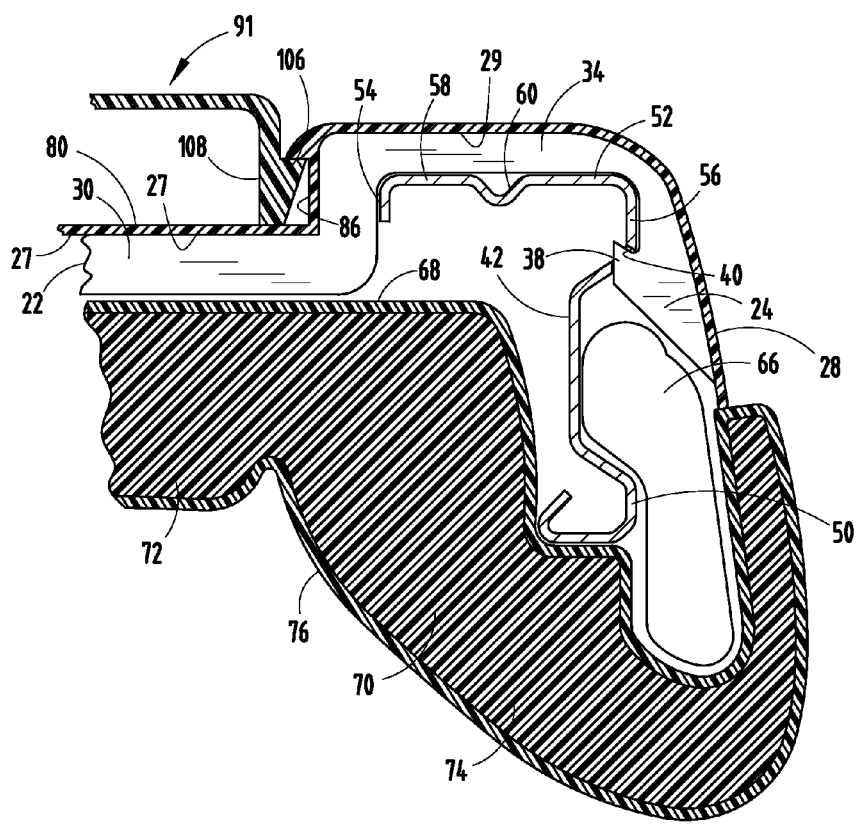
FIG. 5A is a top plan cross-sectional view of area VA of FIG. 5.

Referring now to FIGS. 4-5A, when the distal hooks 38 have engaged the apertures 40 in the seat assembly 10, back cover 16 is connected with the seat frame 42. Additional fasteners or adhesives may be used to connect other portions of the back cover 16 to the seat assembly 10. As shown in the embodiment of FIGS. 5 and 5A, the seat frame 42 includes a bulbous forward portion 50 and a rearward portion 52 with an interior wall 54, an exterior wall 56, and a planar back wall 58. The planar back wall 58 includes a channel 60 that extends vertically down the planar back wall 58 of the rearward portion 52. When the distal hooks 38 are fully engaged with the apertures 40, the planar back wall 58 abuts the second channel portion 34 of the ribs 22. At the same time, the interior wall 54 of the rearward portion 52 abuts the first channel portion 32 of the ribs 22 and the exterior wall 56 of the rearward portion 52 abuts the sidewall 28 of the back cover 16.

Referring again to FIGS. 5 and 5A, side airbags 66 are disposed between the seat 12 and an interior liner 68 of the seat assembly 10, the seat frame 42, and the back cover 16. The side airbags 66 are operably connected with a deployment device (not shown) that deploys the side airbags 66 during a collision event. The connection of the distal hooks 38 with the apertures 40 of the seat frame 42 does not hinder or limit the quick expansion of the side airbags 66 during a collision event. A back cushion 70 having a body portion 72 and side portions 74 disposed adjacent to the seat assembly 10 and the back cover 16. The side portions 74 of the back cushion 70 extend forward relative to the body portion 72 to conceal the seat frame 42 and the side airbags 66 and also to protect a user during a collision event. The side portions 72 also wrap around the seat assembly 10 and abut the back cover 16. The back cushion 70 is covered by an exterior liner 76 that protects the back cushion 70 and wears well against use by passengers. The exterior liner 76 may be constructed from fabric, leather, vinyl, etc.

Figure 6:
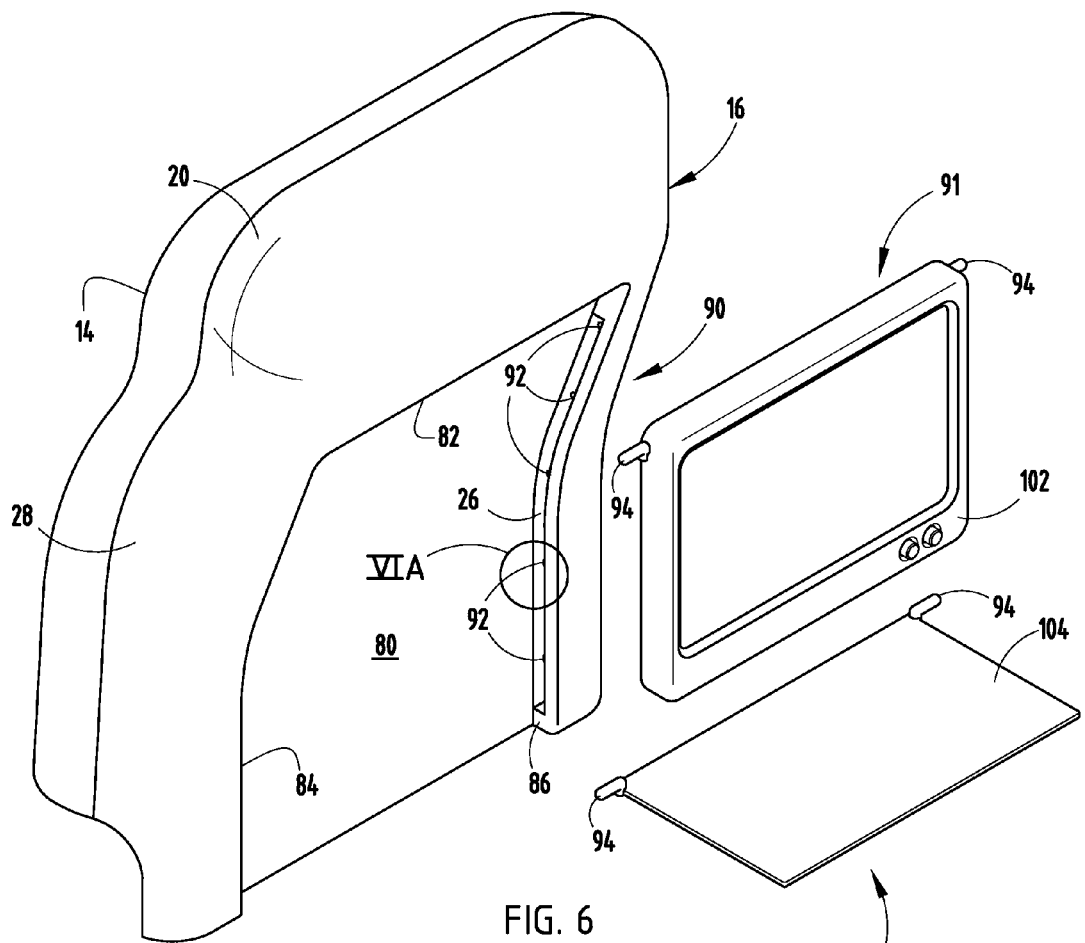
FIG. 6 is a rear perspective view of one embodiment of the modular front seat back panel with and various accessories adapted to be received in the modular front seat back panel.

Referring now to FIG. 6, the exterior side 20 of the back cover 16 includes a recess 80. The recess 80 has a tapered top portion 82 and first and second inside walls 84, 86. The vertically-extending channel 26 extends along each of the inside walls 84, 86 and includes a plurality of securing members 90 spaced along the vertically-extending channel 26. The securing members 90 are adapted to engage any of a variety of accessories 91 when the selected accessory is positioned in the recess 80. It is contemplated that the vertically-extending channel 26 may have a variety of different interfaces, such as those shown in FIGS. 6 and 6A.

Figure 6A:
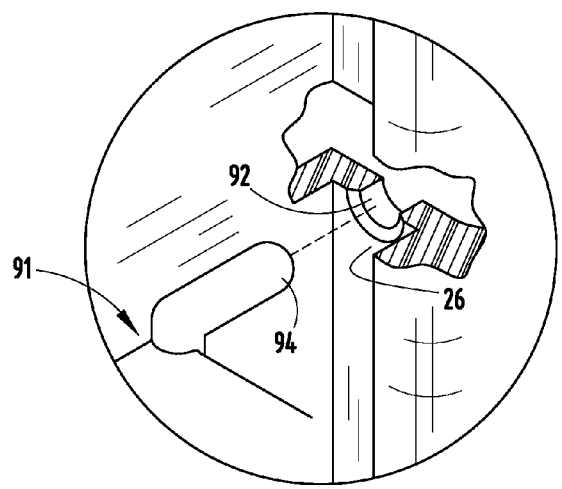
FIG. 6A is an enlarged rear perspective view of the interface between the seat back of FIG. 6 and an accessory.
Figure 7:
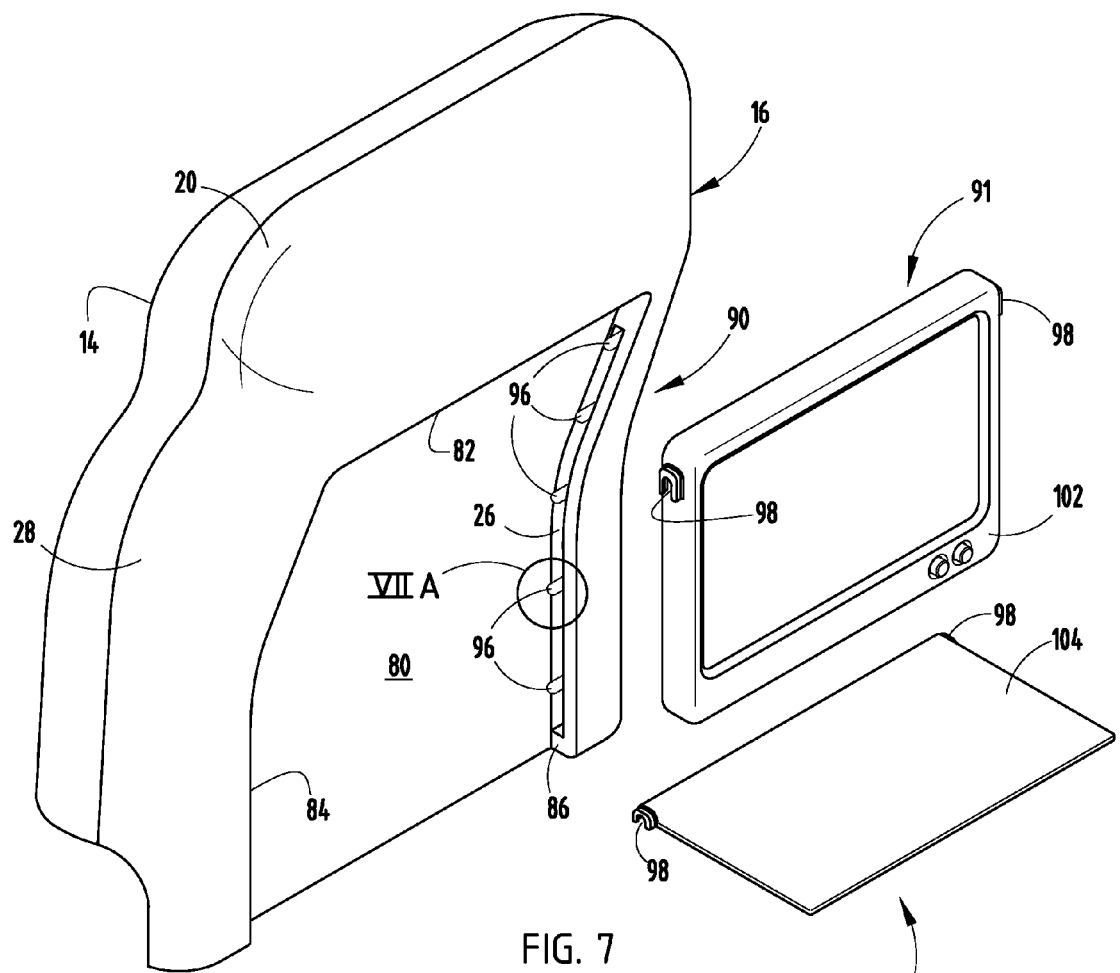
FIG. 7 is a rear perspective view of another embodiment of the modular front seat back panel with and various accessories adapted to be received in the modular front seat back panel.
Figure 7A:
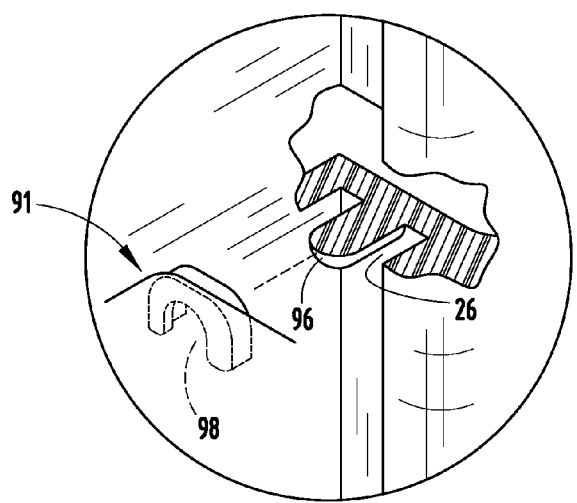
FIG. 7A is an enlarged rear perspective view of the interface between the seat back of FIG. 7 and an accessory.

As shown in FIG. 6A, one embodiment includes a plurality of receiving apertures 92 that are spaced along the longitudinal extent of the vertically-extending channel 26. The plurality of receiving apertures 92 are designed to receive lateral engagement posts 94 that extend from a complementary accessory (FIG. 7A). In another embodiment, as shown in FIG. 7A, a plurality of lateral posts 96 extend inwardly from the vertically-extending channel 26. The lateral posts 96 are designed for reception in U-shaped receivers 98 disposed on sides of a complementary accessory (FIG. 7A). The posts 94, 96, whether connected with the accessory or the back cover 16, are spring-biased to an outward position. Accordingly, a user can push the posts 94, 96 against the spring bias to release the accessory from engagement with the back cover 16.

Figure 8:
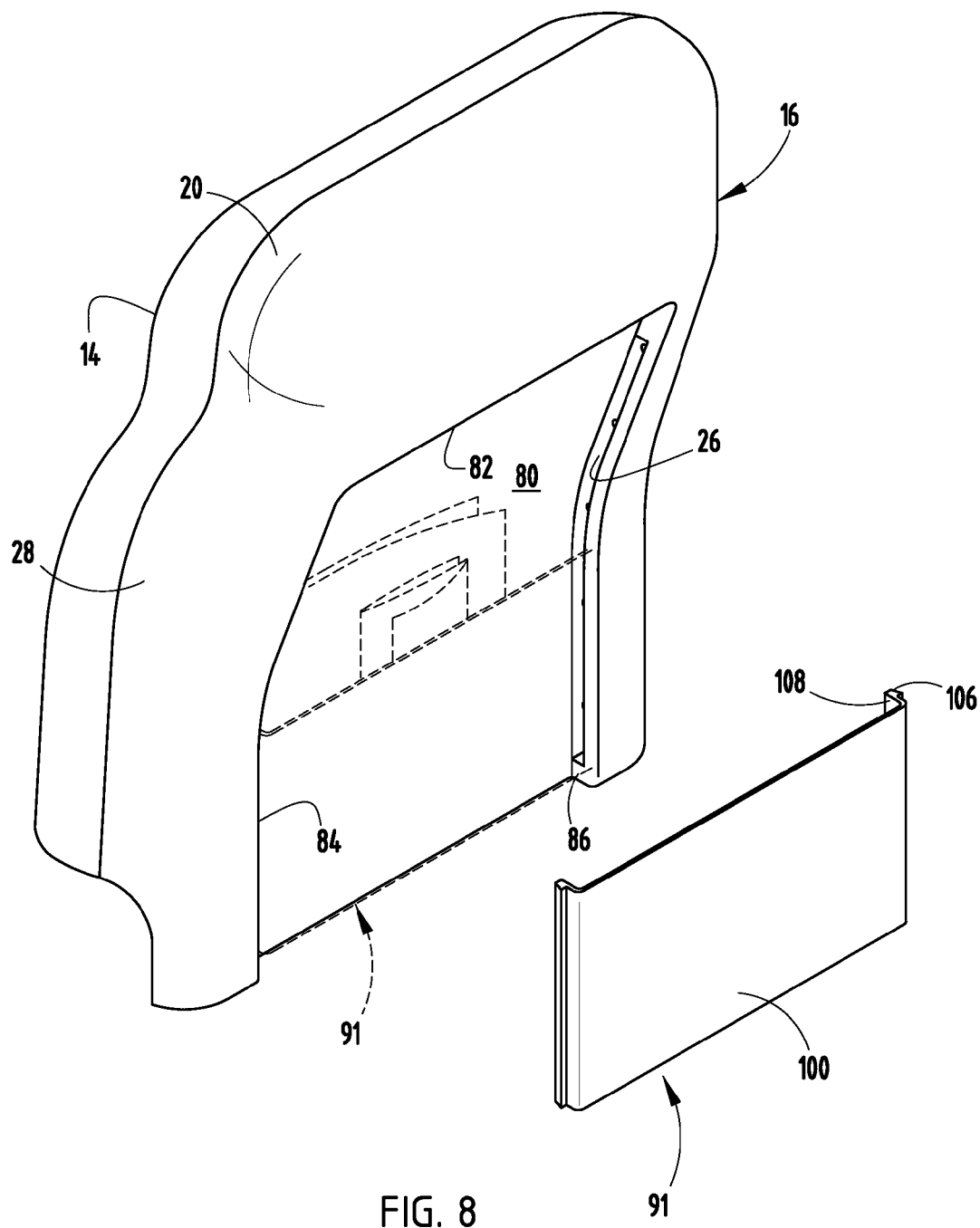
FIG. 8 is a rear perspective view of the modular front seat back panel connected with a map pocket.
Figure 9:
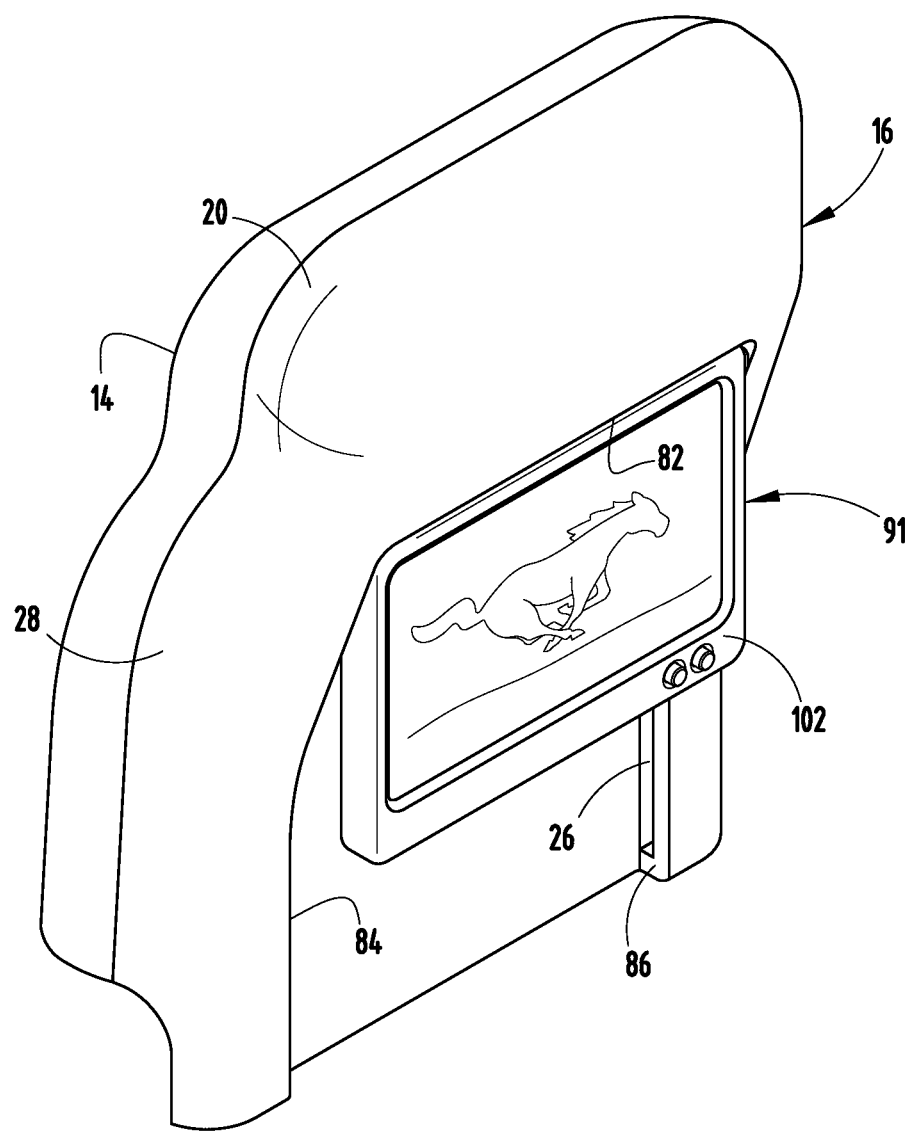
FIG. 9 is a rear perspective view of the modular front seat back panel connected with an LCD screen.
Figure 10:
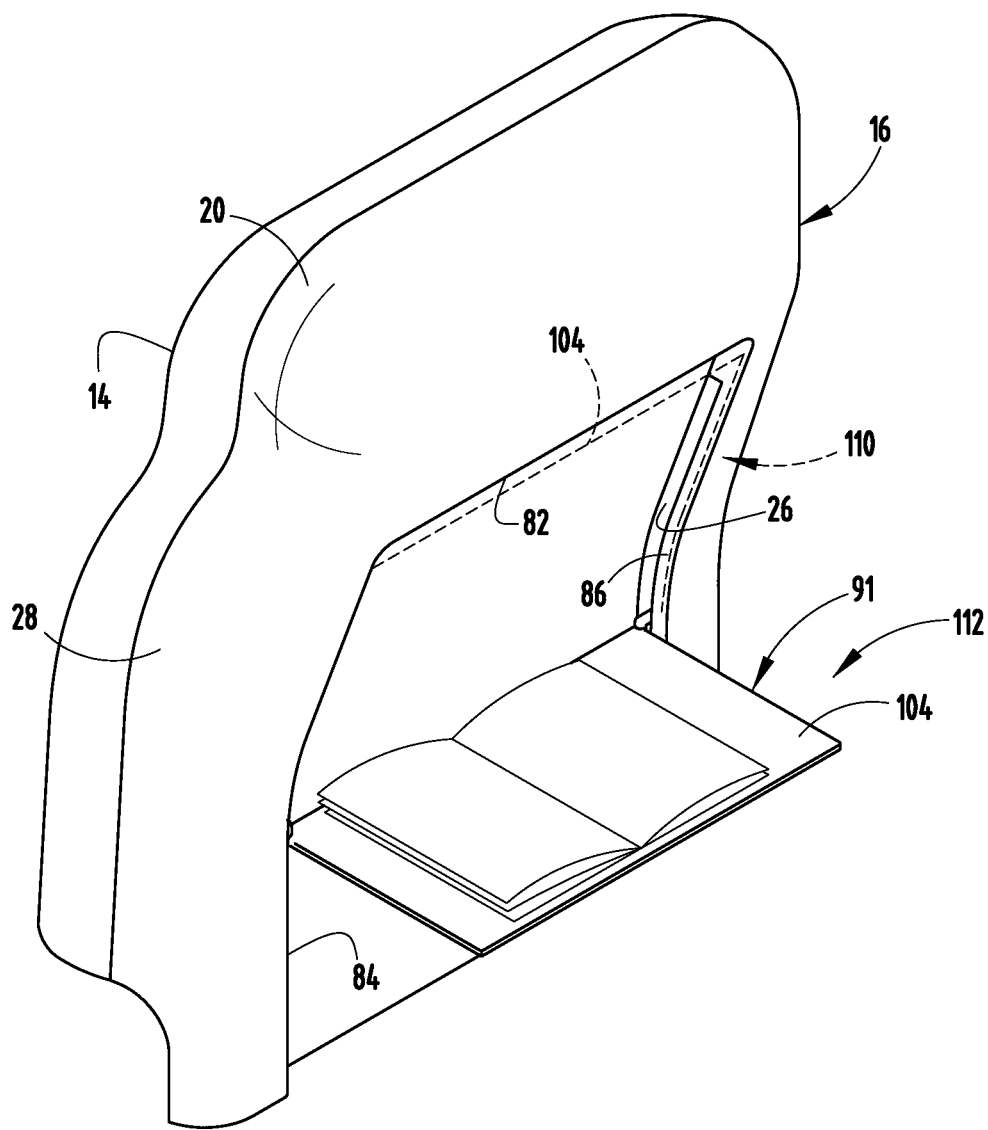
FIG. 10 is a rear perspective view of the modular front seat back panel connected with a foldable tray table.

Referring now to FIGS. 8-10, a variety of accessories are adapted for connection with the vertically-extending channels 26 on the exterior side 20 of the back cover 16. As examples only, a literature pocket 100, an audio/video player 102, and a tray table 104 are illustrated, each of which is adapted for connection with the back cover 16. It is contemplated that one accessory, or possibly multiple accessories, may be connected at one time. It is further contemplated that various other accessories having similar or different functionality may be connected with the back cover 16.

Referring to FIGS. 5, 5A, and 8, the literature pocket 100 is shown that engages the vertically-extending channel 26 of the back cover 16. The literature pocket 100 is designed to snap into place, providing an audio, visual, or tactile cue that the literature pocket 100 is connected. The literature pocket 100 is held in place by a flange 106 that extends laterally outwardly from side portions 108 of the literature pocket 100, and which forms an interference fit connection with the vertically-extending channel 26. The flange 106 may extend fully down the side of the literature pocket 100 or extend intermittently along the side portions 108. The literature pocket 100 does not utilize posts 94, 96 or receiving apertures 92, but instead engages only with the vertically-extending channel 26. The receiving apertures 92 (FIG. 6A) or posts 96 (FIG. 7A) that are disposed in the vertically-extending channel 26 do not interfere with the connection of the literature pocket 100 to the vertically-extending channel 26.

Referring now to the embodiment illustrated in FIG. 9, the audio/video player 102 may be connected to the vertically-extending channel 26 by one of the manners discussed above with reference to FIGS. 6-7A. The audio/video player 102 is pivotally engaged with the back cover 16, such that the audio/video player 102 can be rotated to an ideal viewing position for viewing by a passenger sitting behind the seat assembly 10.

Referring now to FIG. 10, the illustrated embodiment shows the tray table 104 having lateral engagement posts 94 adapted to operably couple with the laterally aligned receiving apertures 92 in the vertically-extending channels 26 of the back cover 16, which consequently holds the tray table 104 in horizontal alignment relative to the back cover 16. In another embodiment, the tray table 104 includes U-shaped receivers 98 that engage lateral posts 96 disposed in the vertically-extending channel 26 and which support the tray table 104 in a horizontal position inside the vehicle. In either of these embodiments, it is contemplated that the tray table 104 may be disposed in a stowed position 110 and a deployed position 112.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A seat assembly comprising:
a seat;
a seat back pivotally connected to the seat;
a back cover disposed on a rear of the seat back, the back cover having an exterior side and an interior side including multiple, parallel ribs extending across the back cover and terminating at a plurality of engagement members engaged with a seat frame, wherein the engagement members are laterally-extending inwardly directed hooks; and
at least one vertically-extending channel disposed on the exterior side of the back cover.

2. The seat assembly of claim 1, wherein the laterally-extending reinforcing ribs are positioned in a lumbar region of the seat back.

3. The seat assembly of claim 1, further comprising:
a peripheral recess including a tapered top wall disposed on the interior side of the back cover.

4. The seat assembly of claim 1, wherein the vertically-extending channel includes at least one securing member adapted to support an item engaged in the vertically-extending channel.

5. The seat assembly of claim 1, further comprising:
at least one accessory adapted for removable engagement with the vertically-extending channel.

6. The seat assembly of claim 1, further comprising:
a tray table operably connected with the at least one vertically-extending channel.

7. The seat assembly of claim 1, further comprising:
a video player operably connected with the at least one vertically-extending channel.

8. The seat assembly of claim 1, further comprising:
an accessory pocket operably connected with the at least one vertically-extending channel.

9. A vehicle seat assembly, comprising:
a seat back;
a back cover disposed on the seat back, the back cover having an interior side that includes a peripheral channel and a plurality of laterally-projecting reinforcing ribs extending across the channel and aligned with a plurality of laterally-extending inwardly directed hooks; and
a recess disposed on an exterior side, the recess including first and second side edges that have a vertically-extending channel.

10. The seat assembly of claim 9, further comprising:
a seat frame having apertures adapted to receive the laterally-extending inwardly directed hooks.

11. The seat assembly of claim 9, wherein the laterally-projecting reinforcing ribs are positioned in a lumbar region of the seat back.

12. The seat assembly of claim 9, wherein the recess includes a tapered top wall.

13. The seat assembly of claim 9, wherein the vertically-extending channel includes at least one securing member adapted to support an item engaged in the vertically-extending channel.

14. The seat assembly of claim 9, further comprising:
at least one accessory adapted for removable engagement with the vertically-extending channel.

15. A method of making a vehicle seat, comprising:
providing a seat back;
attaching a back cover to the seat back, the back cover having an interior side and an exterior side;
forming a plurality of laterally-extending reinforcing ribs across the interior side;
forming a plurality of engagement members at an end of each reinforcing rib;
forming a recess on the exterior side;
forming side edges in the recess that have a vertically-extending channel; and
providing at least one securing member in the vertically-extending channel.

16. The method of claim 15, further comprising:
attaching at least one accessory with the vertically-extending channel.

17. The method of claim 15, further comprising:
forming laterally-extending inwardly directing hooks adapted to engage a seat frame adjacent to the laterally-extending reinforcing ribs.

* * * * *